April 7, 1936.    H. F. RITTER    2,036,720
COILABLE METAL TAPE
Filed July 8, 1935
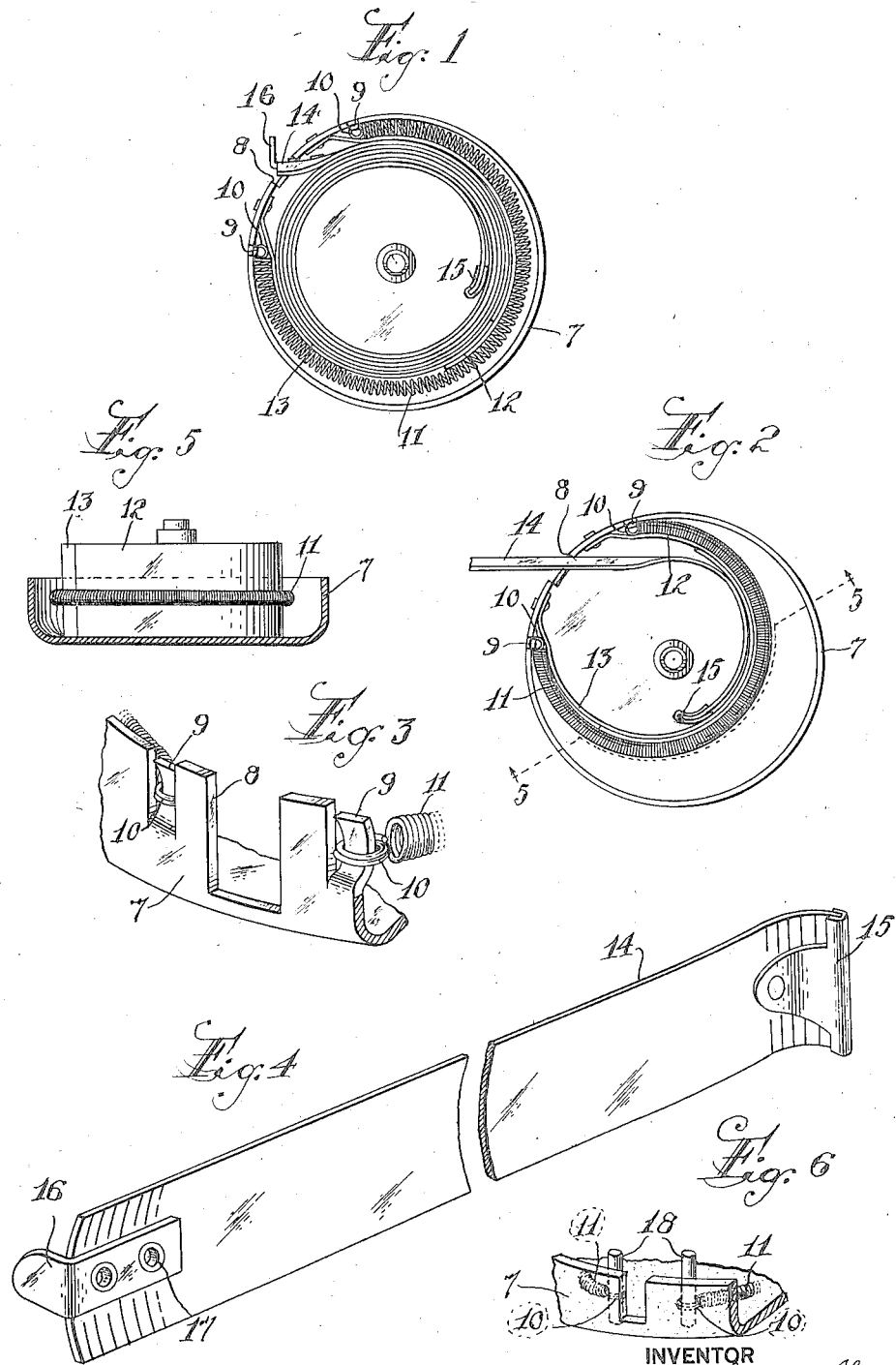
INVENTOR
Herbert F. Ritter
BY C. James Cottrell
ATTORNEY Patented Apr. 7, 1936

2,036,720

UNITED STATES PATENT OFFICE 2,036,720

COILABLE METAL TAPE

Herbert F. Ritter, Bogota, N. J.

Application July 8, 1935, Serial No. 30,315

7 Claims. (Cl. 33—138)

This invention relates to coilable metal measuring tapes; and more particularly to coilable metal measuring tapes of the concavo-convex type or other suitable non-planar forms, which have sufficient length, thickness and curvature to enable them to be relatively stiff and straight when extended.

Heretofore, coilable metal tapes of the type herein considered have been enclosed in casings and attached to coiled springs, which have a winding effect in the ratchet type, or a counter-balancing effect in the "push-pull" type. In both the push-pull and ratchet types of tapes, there has generally been used a winding drum, which in some instances consists of the first coil of the tape, that is, one end of the tape is coiled upon itself and secured to the tape.

In the push-pull type of tape, the spring is of insufficient strength to wind the tape, but has a counterbalancing effect upon the concavo-convex tape, so that the tape can be withdrawn manually from the casing and remain unaided at any length to which it may be extended. However, the use of a counterbalancing spring is objectionable in that the spring is sensitive and accordingly expensive, and great care is required in assembling the tape and spring in the casing.

It is, therefore, an object of this invention to provide a "push-pull" measuring device having a concavo-convex tape which will remain unaided at any length to which it may be extended without the use of a sensitive counter-balancing spring or a winding spring of any kind.

A further object is the provision of a measuring device having a concavo-convex tape which requires no winding drum, and which can be completely withdrawn from its casing and used for measuring purposes independently of the casing.

These and other objects are attained by the novel construction, combination and arrangement of parts hereinafter described and shown in the accompanying drawing, constituting a material part of this disclosure, and in which:

Fig. 1 is a plan view of a measuring device, with the cover of the casing removed, showing the position of the tape and associated parts with the tape substantially completely wound into the casing.

Fig. 2 is a plan view with the cover removed, showing the position of the tape and associated parts at the beginning of the operation of coiling the tape into the casing.

Fig. 3 is a perspective view of a portion of a casing, showing the manner in which the ends of a coiled spring are attached to the casing.

Fig. 4 is a perspective view of a concavo-convex measuring tape having one of its ends curved.

Fig. 5 is a sectional view taken on the line 5—5 of Fig. 2.

Fig. 6 is a perspective view of a portion of a casing, showing another method of attaching the ends of a coiled spring to a casing when the latter is made from a phenolic-condensation product or the like.

Referring to the drawing, there is shown a casing 7, having an opening 8 in the peripheral wall thereof through which passes a metal tape 14 of the concavo-convex type or a similar non-planar form.

The casing 7 is preferably made of metal, and on each side of the opening 8, tabs 9 are struck inwardly from the wall of the casing. Attached to the tabs 9 are the ends 10 of a coiled spring 11, positioned in the casing, and encircling a pair of arcuate overlapping leaf springs 12 and 13, which are not connected to each other. One end of spring 12 is attached to the casing at one side of the opening 8, and similarly, one end of spring 13 is attached to the casing on the other side of the opening.

Inasmuch as the tape 14 has no direct connection with the casing or the springs, it can be completely withdrawn from the casing and used independently for measuring purposes as indicated in Fig. 4. In order to facilitate the coiling of the tape in the casing, the inner end of the casing is curved inwardly and provided with a metal clip 15. The tape may be manipulated during the withdrawal thereof by a fingerpiece 16 secured thereto by eyelets 17 or the like.

When the casing is made of a phenolic-condensation product or other non-metallic substance, metal posts 18 are embedded in the bottom of the casing, (see Fig. 6) on each side of the opening, and the ends 10 of the coiled spring 11 are attached to the posts 18.

In operation, when it is desired to coil the tape into the casing, the curved end having the clip 15 is inserted through the opening 8 and engages the leaf springs 12 and 13. Due to the overlapping of the leaf springs, they offer a resilient resistance to the tape in a plurality of directions and provide a smooth surface over which the clip 15 can slide in forming the first convolution. The coiled spring 11 is inherently expansible in a plurality of directions and constantly exerts a resilient pressure on the leaf springs to maintain the latter in a substantially circular shape.

From the above description, it will be seen that

I have provided a measuring device having a concavo-convex tape which can be completely withdrawn from the casing and used independently of the casing. When not completely withdrawn from the casing, the tape is coiled or uncoiled from the casing in the same manner as a measuring tape of the "push-pull" type. However, it will be noted that the measuring device herein described employs no winding or counterbalancing spring of any kind; nor does it use a winding drum or its equivalent.

While there has been specified herein the use of a coiled spring 11, it is obvious that other types of resilient devices which are inherently expansible in a plurality of directions can be used to encircle the leaf springs 12 and 13, without departing from the spirit of the invention.

By eliminating the use of winding springs or sensitive counter-balancing springs, and winding drums, the cost of manufacturing a smoothly operating push-pull type of measuring tape obviously is considerably reduced. At the same time, satisfactory operation is insured at all times, as the weakening of the springs after extended use will have no appreciable effect on the operation as is the case with measuring devices employing winding springs or counter-balancing springs.

The foregoing disclosure is to be regarded as descriptive and illustrative only, and not as restrictive or limitative of the invention, of which an embodiment may be constructed including modifications without departing from the general scope herein indicated and denoted in the appended claims.

Having thus described my invention, what I claim as new and desire to secure by Letters Patent, is:

1. In a tape measuring device, a casing having a tape opening in its peripheral wall, an arcuate leaf spring attached to the casing at one side of the opening and having its other end free, a second arcuate leaf spring attached to the casing at the other side of the opening and having its other end free, said leaf springs overlapping and engaging each other, a coiled spring encircling and engaging said leaf springs, said coiled spring having its ends attached to the casing at each side of said opening, and a resilient tape of normally concavo-convex cross-sectional shape having one end thereof positioned in the casing, the end of the tape in the casing being curved and engaging said leaf springs.

2. In a tape measuring device, a casing having a tape opening in its peripheral wall, an arcuate leaf spring attached to the casing at one side of the opening and having its other end free, a second arcuate leaf spring attached to the casing at the other side of the opening and having its other end free, said leaf springs overlapping and engaging each other, a coiled spring encircling and engaging said leaf springs, said coiled spring having its ends attached to the casing at each side of said opening, and a resilient tape of normally concavo-convex cross-sectional shape having one end thereof positioned in the casing and engaging said leaf springs.

3. In a tape measuring device, a casing having a tape opening in its peripheral wall, an arcuate leaf spring attached to the casing at one side of the opening and having its other end free, a second arcuate leaf spring attached to the casing at the other side of the opening and having its other end free, said leaf springs overlapping and engaging each other, a coiled spring encircling and engaging said leaf springs, said coiled spring having its ends attached to the casing at each side of said opening, and a resilient tape of normally concavo-convex cross-sectional shape positioned in the casing and engaging said leaf springs.

4. In a tape measuring device, a casing having a tape opening in its peripheral wall, an arcuate leaf spring attached to the casing at one side of the opening and having its other end free, a second arcuate leaf spring attached to the casing at the other side of the opening and having its other end free, said leaf springs overlapping and engaging each other, a coiled spring encircling and engaging said leaf springs, said coiled spring having its ends attached to the casing at each side of said opening, and a resilient tape of normally concavo-convex cross-sectional shape positioned in the casing and engaging said leaf springs, said tape being free from attachment to the casing or the leaf springs so that it can be withdrawn entirely from the casing.

5. In a tape measuring device, a casing having a tape opening in its peripheral wall, an arcuate leaf spring attached to the casing at one side of the opening and having its other end free, a second arcuate leaf spring attached to the casing at the other side of the opening and having its other end free, said leaf springs overlapping and engaging each other, a resilient member inherently expansible in a plurality of directions positioned in the casing and encircling the leaf springs, said resilient member having its ends attached to the inner peripheral wall of the casing at each side of said opening, said resilient member being of sufficient length and strength to constantly engage said leaf springs, and a resilient tape of normally non-planar cross-sectional shape positioned in the casing and engaging said leaf springs.

6. In a tape measuring device, a casing having a tape opening in its peripheral wall, a pair of arcuate leaf springs attached to the peripheral wall of the casing at opposite sides of the opening, said leaf springs overlapping and engaging each other, and a resilient member encircling said leaf springs and having its ends attached to the peripheral wall of the casing at each side of said opening, said resilient member being of sufficient strength and length to constantly engage and encircle said leaf springs.

7. In a tape measuring device, a casing having a tape opening in its peripheral wall, lugs struck out from the casing on each side of said opening, a pair of arcuate leaf springs attached to the peripheral wall of the casing at opposite sides of the opening, said leaf springs overlapping and engaging each other, and a resilient member having its ends attached to the lugs on each side of the opening, said resilient member encircling said leaf springs and being of sufficient strength and length to constantly engage and encircle said leaf springs.

HERBERT F. RITTER.